US011719844B2

(12) United States Patent
Koushavand

(10) Patent No.: US 11,719,844 B2
(45) Date of Patent: Aug. 8, 2023

(54) SYSTEM AND METHOD FOR ANALYZING RESERVOIR CHANGES DURING PRODUCTION

(71) Applicant: Husky Oil Operations Limited, Calgary (CA)

(72) Inventor: Behrang Koushavand, Calgary (CA)

(73) Assignee: Cenovus Energy Inc., Calgary (CA)

( * ) Notice: Subject to any disclaimer, the term of this patent is extended or adjusted under 35 U.S.C. 154(b) by 244 days.

(21) Appl. No.: 17/021,596

(22) Filed: Sep. 15, 2020

(65) Prior Publication Data

US 2021/0080607 A1 Mar. 18, 2021

Related U.S. Application Data

(60) Provisional application No. 62/901,044, filed on Sep. 16, 2019.

(51) Int. Cl.
*G01V 1/50* (2006.01)
*G06N 3/08* (2023.01)
*G01V 1/30* (2006.01)

(52) U.S. Cl.
CPC ................ *G01V 1/50* (2013.01); *G01V 1/308* (2013.01); *G06N 3/08* (2013.01); *G01V 2210/612* (2013.01)

(58) Field of Classification Search
None
See application file for complete search history.

(56) References Cited

U.S. PATENT DOCUMENTS

2020/0158898 A1* 5/2020 Le Guern .............. G01V 1/345
2020/0278465 A1* 9/2020 Salman .................. G01V 1/301
2021/0247534 A1* 8/2021 Bø ......................... G01V 1/302

FOREIGN PATENT DOCUMENTS

WO WO-2019241062 A1 * 12/2019 ............ G01V 1/302

OTHER PUBLICATIONS

Jinling Zhang, Dragana Todorovic-Marinic, Dominique Holy, and Ying Zou, (2017), "Quantitative mapping and classification of a steam chamber: fluid saturation, temperature, and phase change, an integrated oil-sands study," SEG Technical Program Expanded Abstracts : 5901-5905 (Year: 2017).*

(Continued)

*Primary Examiner* — Lina Cordero
(74) *Attorney, Agent, or Firm* — Gordon & Jacobson, P.C.

(57) ABSTRACT

There is disclosed a system and method for analyzing geological features of a reservoir, such as a subterranean hydrocarbon reservoir undergoing changes during different stages of its production, by utilizing an artificial neural network to learn from hydrocarbon reservoir production project. In an aspect, there is provide a system and method for utilizing data collected from 4D seismic studies in order to train an artificial neural network to recognize how physical properties of a hydrocarbon reservoir change over time, as the hydrocarbon reservoir is produced. In an embodiment, the system and method are adapted to generate and obtain a plurality of image slices or image planes derived from a 3D seismic baseline and at least one monitor acquired over the course production of the hydrocarbon reservoir. Corresponding 2D image slices derived from the 3D seismic baseline and a subsequent monitor are correlated and matched and are then used to train an artificial neural network to create a predictive model of how the reservoir may change over time.

23 Claims, 9 Drawing Sheets

(56) References Cited

OTHER PUBLICATIONS

"TensorFlow: a system for large-scale machine learning", Abadi M., et al. (2016) arXiv: Distributed, Parallel, and Cluster Computing, 265-283. Retrieved Feb. 18, 2019, from https://usenix.org/system/files/conference/osdi16/osdi16-abadi.pdf.
"Deep Learning", Goodfellow I., et al. (2016). MIT Press. Retrieved Mar. 19, 2019, available at http://www.deeplearningbook.org.
"The Distribtuion of the Flora in the Alpine Zone", Jaccard P., (1912) New Phytologist, 11(2), 37-50. Retrieved Mar. 14, 2019, from http://biocomparison.ucoz.ru/_Id/0/92_Jaccard_1912.pdf.
Keras Documentation, (n.d.). Retrieved Mar. 21, 2019, from https://keras.io/#you-have-just-found-keras.
"Adam: A Method for Stochastic Optimization", Kingma, D.P. et al., (2015), arXiv: Learning. Retrieved Mar. 19, 2019, from https://arxiv.org/pdf/1412.6980.
"Modelling of 4D Seismic Data for the Monitoring of Steam Chamber Growth During the SAGD Process", Lerat, O. et al., (2010) Journal of Canadian Petroleum Technology, 49(06), 21-30. Retrieved Feb. 16, 2019, from https://onepetro.org/journal-paper/spe-138401-pa.
"Nonlinear pairwise alignment of seismic traces", Liner, C.L. et al, (2004). Geophysics, 23(11), 1146-1150. Retrieved Feb. 7, 2019, from http://sepwww.stanford.edu/data/media/public/docs/sep112/bob2.pdf.
Python 3.3.0 Release, (n.d.). Retrieved Mar. 21, 2019, from Python.org: https://www.python.org/download/releases/3.3.0/.
"U-Net: Convolutional Networks for Biomedical Image Segmentation", Ronneberger, O. et al., (2015), arXiv: Computer Vision and Pattern Recognition, Retrieved Feb. 6, 2019, from https://arxiv.org/pdf/1505.04597.

* cited by examiner

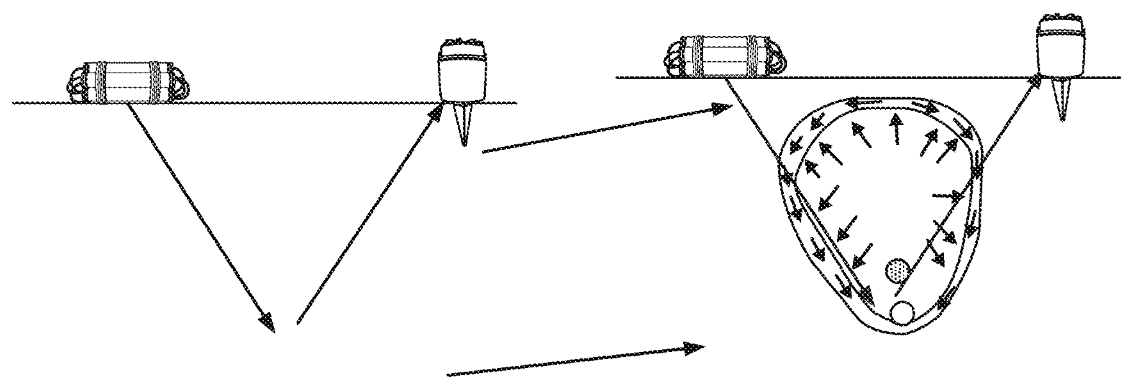
FIG. 3A
FIG. 3B
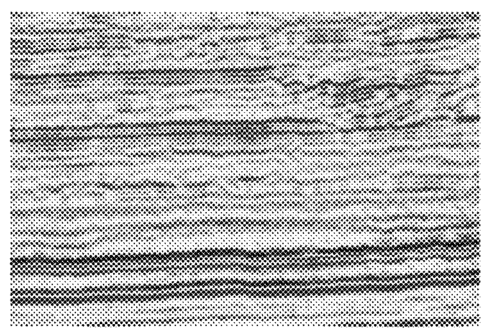
FIG. 3C
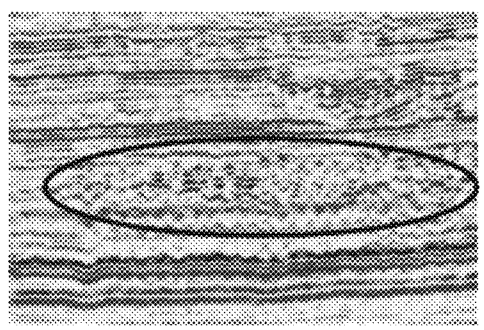
FIG. 3D

SYSTEM AND METHOD FOR ANALYZING RESERVOIR CHANGES DURING PRODUCTION

CROSS-REFERENCE TO RELATED APPLICATIONS

This application claims the benefit of U.S. Provisional Application No. 62/901,044, filed on Sep. 16, 2019, which is herein incorporated by reference in its entirety.

FIELD

The present disclosure relates generally to the field of analyzing geological features of a reservoir, such as a subterranean hydrocarbon reservoir undergoing changes during different stages of its production.

BACKGROUND

Various modern extraction techniques have been developed to extract hydrocarbon deposits from subterranean hydrocarbon reservoirs more cost effectively. One such technique is steam-assisted gravity drainage (SAGD) which allows production of heavy crude oil and bitumen from oil sands by utilizing a pair of horizontal wellbores, drilled in parallel one above the other. In a typical setup, high pressure steam is continuously injected into an upper wellbore, which heats the surrounding heavy crude oil or bitumen and allows the crude oil or bitumen to flow and drain into a lower wellbore. The oil collected by the lower wellbore is then extracted to the surface. As a hydrocarbon reservoir is produced using SAGD techniques, it undergoes fluid changes, including the formation of a steam chamber which gradually replaces the heavy crude oil or bitumen being extracted. It is desirable to monitor the formation and growth of this steam chamber in order to assess progress, and to determine the stage of production of a reservoir. This information can be used to optimize the production and increase the net present value of the project by modifying the production strategies such as increasing the amount of steam injection to the areas with smaller steam chamber, etc.

Expensive and time consuming conventional 4D seismic studies, i.e. a series of 3D seismic data of recorded sound waves which have traveled through the Earth layers, acquired at different points in time, have been employed in the past to monitor the changes of a hydrocarbon reservoir undergoing SAGD production. Valuable information can be obtained by studying the differences of two 3D seismic volumes of a reservoir that are acquired at different stages of production. Typically, a 3D seismic baseline is acquired before production starts, and thereafter a series of 3D seismic volumes, called monitors, are obtained periodically during production. By comparing the monitors to the baseline, it is possible to obtain very useful information on reservoir fluid changes and make any adjustments as may be necessary to increase production performance.

However, given the expense and significant time consumed to perform conventional 4D seismic studies, collect data, and construct a geological model, interpreting and utilizing this information can be cumbersome. Furthermore, the 4D seismic study is typically relevant only for the particular reservoir that has been studied.

What is therefore needed is an improved system and method for analyzing production-induced changes of a reservoir, and for monitoring the progress of these changes in a less costly and more efficient manner, with shorter timeliness of actionable data.

SUMMARY

The present disclosure relates to a system and method for analyzing a subterranean hydrocarbon reservoir undergoing changes during different stages of its production, by utilizing an artificial neural network.

In an aspect, there is provided a system and method for utilizing data collected from 4D seismic studies in order to train an artificial neural network to recognize how physical properties of a hydrocarbon reservoir change over time, as the hydrocarbon reservoir is produced.

In an embodiment, the system and method is adapted to generate and obtain a plurality of image slices or image planes derived from a 3D seismic baseline and at least one monitor acquired over the course of a 4D seismic study. Corresponding 2D image slices derived from the 3D seismic baseline and a subsequent monitor are correlated and matched, and are then used to train an artificial neural network to create a predictive model of how the reservoir properties may change over time.

In an embodiment, the artificial neural network is trained to identify and segment objects in 2D image, each 2D image corresponding to an image slice acquired from 3D seismic data, and to understand how the segmented objects change over time based on the steam supplied and oil extracted from the reservoir.

In an embodiment, the trained artificial neural network can be used to predict the steam chamber in the same reservoir using later monitors or in a completely different reservoir without doing any complex conventional 4D seismic calculation. The trained neural network can predict the steam chamber location and size with high accuracy and in a very short time.

In an embodiment, the presented system was applied in a hydrocarbon reservoir produced using a SAGD technique, and the segmented object identified by the artificial neural network in each image slice is a steam chamber which forms and grows over time as the hydrocarbon reservoir is produced. However, the present system and method can also train an artificial neural network to predict changes in reservoirs using other production techniques.

By training the artificial neural network on many thousands of image slices from multiple 4D seismic studies, the system and method is used to develop a prediction model which can predict how features such as a heated zone or steam chamber may develop and grow over time.

Later, the trained model can be used to predict the physical changes on new hydrocarbon reservoir under the production. It can generate similar result to the conventional 4D seismic study in a shorter time. The model can then be used to provide actionable data, which may be used to modify parameters or alter production methods in order to increase production efficiency.

In this respect, before explaining at least one embodiment of the invention in detail, it is to be understood that the invention is not limited in its application to the details of construction and to the arrangements of the components set forth in the following description or the examples provided therein, or illustrated in the drawings. Therefore, it will be appreciated that a number of variants and modifications can be made without departing from the teachings of the disclosure as a whole. Therefore, the present system, method and apparatus is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 3A and FIG. 3B show schematic diagrams of obtaining seismic data from a producing reservoir.

FIG. 3C illustrates a two-dimensional (2D) slice of a baseline seismic image, and FIG. 3D illustrates a later acquired seismic image monitor with noticeable changes in seismic data within the oval marking.

Figure 1:
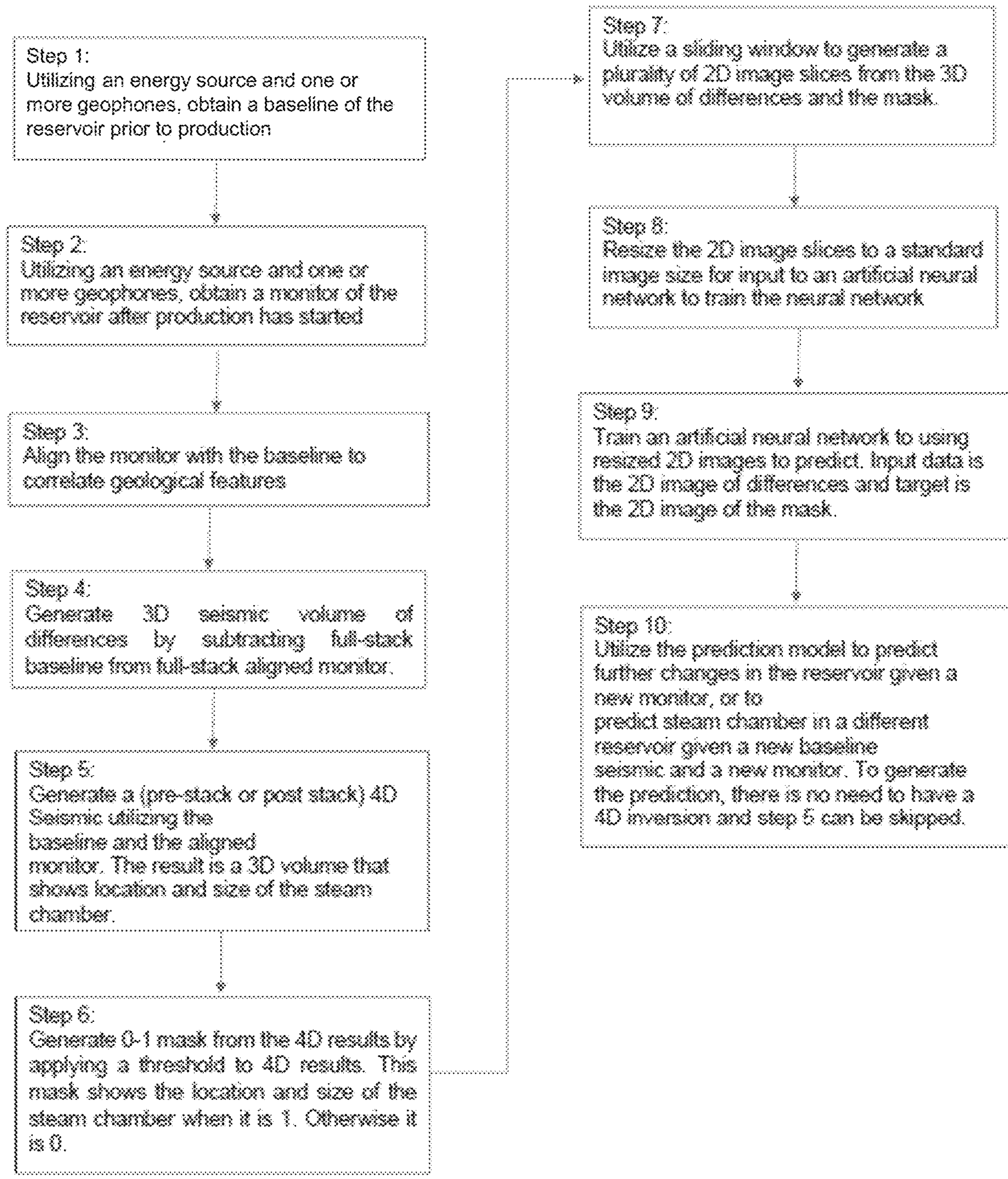
FIG. 1 shows a schematic flowchart of a method in accordance with an embodiment.

In the drawings, embodiments are illustrated by way of example. It is to be expressly understood that the description and drawings are only for the purpose of illustration and as an aid to understanding, and are not intended as describing the accurate performance and behavior of the embodiments and a definition of the limits of the invention.

DETAILED DESCRIPTION

As noted above, the present disclosure relates to a system and method for analyzing physical changes of a reservoir, such as a subterranean hydrocarbon reservoir undergoing changes during different stages of its production, by utilizing an artificial neural network to learn from one or multiple hydrocarbon reservoir production project.

In an aspect, there is provided a system and method for utilizing data collected from 4D seismic studies in order to train an artificial neural network to recognize how physical properties of a hydrocarbon reservoir change over time, as the hydrocarbon reservoir is produced.

In an embodiment, the system and method is adapted to generate and obtain a plurality of image slices or image planes derived from a 3D seismic baseline and at least one monitor acquired over the course of a 4D seismic study. Corresponding 2D image slices derived from the 3D seismic baseline and a subsequent monitor are correlated and matched, and are then used to train an artificial neural network to create a predictive model of how a reservoir may change over time of production.

In an embodiment, the artificial neural network is trained to identify and segment objects in 2D image, each 2D image corresponding to an image slice acquired from 3D seismic data, and to understand how the segmented objects change over time based on the rate of oil extracted from the reservoir.

In an embodiment, the presented method and system are applied on a hydrocarbon reservoir produced using an SAGD technique, and the segmented object identified by the artificial neural network in each image slice is a steam chamber which forms and grows over time as the hydrocarbon reservoir is produced. However, the present system and method can also train an artificial neural network to predict formation and changes in reservoirs using other production techniques.

By training the artificial neural network on many thousands of image slices from a 4D seismic study, the system and method is used to develop a prediction model which can predict how physical properties of the reservoir such as a steam chamber may develop and grow over time. This prediction model can be used in other hydrocarbon reservoirs by applying it to a given 3D seismic baseline and the monitor. A well trained artificial neural network can generate very similar results to the conventional 4D seismic inversion. Illustrative embodiments of the system and method will now be described in more detail with reference to the drawings.

Now referring to FIG. 1, shown is a schematic flowchart of a method in accordance with an embodiment. As shown, the method begins by utilizing an energy source and one or more geophones to obtain a seismic baseline of a reservoir prior to its production (step 1). The method then proceeds to acquire a monitor of the reservoir after production has started (step 2). The method then aligns the monitor with the seismic baseline to correlate geological features, such that the aligned monitor and the baseline can be directly compared (step 3). The method then proceeds to calculate the 3D difference volume between the baseline and the aligned monitor (step 4). The method then proceeds to generate a 4D seismic inversion by utilizing the baseline, and the aligned monitor (step 5). The method then generates 0-1 mask from 4D inversion by applying a threshold to identify steam chamber or heated zone (step 6). Steps 5 and 6 are only required for training purpose of the neural network. For the prediction purpose these steps 5 and 6 should be skipped. The method then utilizes a sliding window to generate a plurality of 2D image slices from the 3D difference volume and the mask for input into an artificial neural network (step 7). The method resizes the 2D image slices to a standard image size for input into an artificial network to train the network to recognize certain physical changes that occur during the production (step 8). The method then generates a prediction model for predicting the formation and change steam chamber over time, based on the training data (step 9). Utilizing the trained prediction model, the method can then be used to predict further changes to the reservoir or predict the formation and change of the steam chamber for a new reservoir, given a new baseline and a monitor (step 10).

Figure 2A:
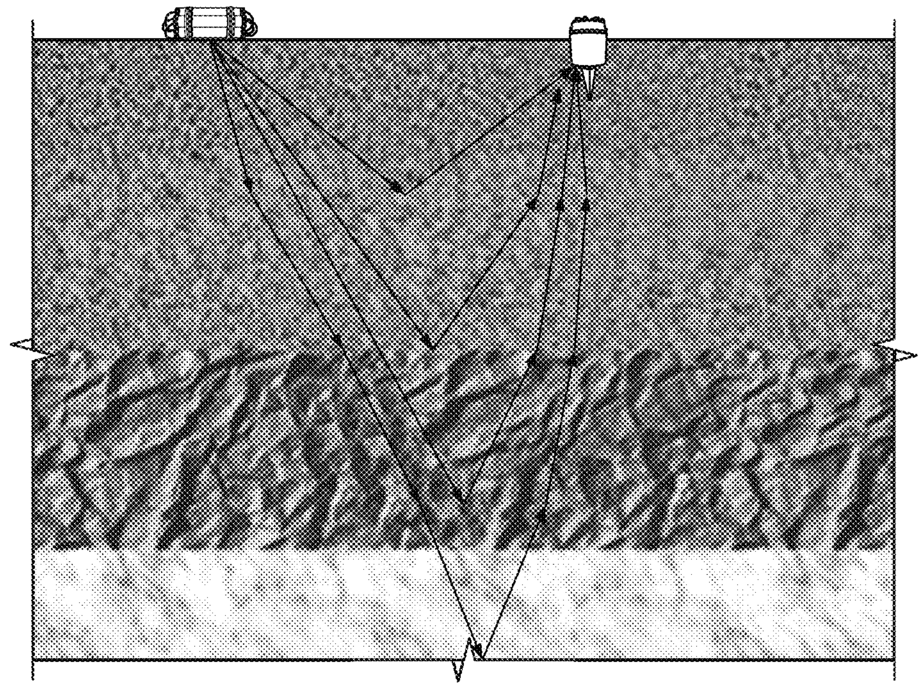
FIG. 2A and FIG. 2B show illustrative diagrams of seismic waves reflecting off of various geological features.
Figure 2B:
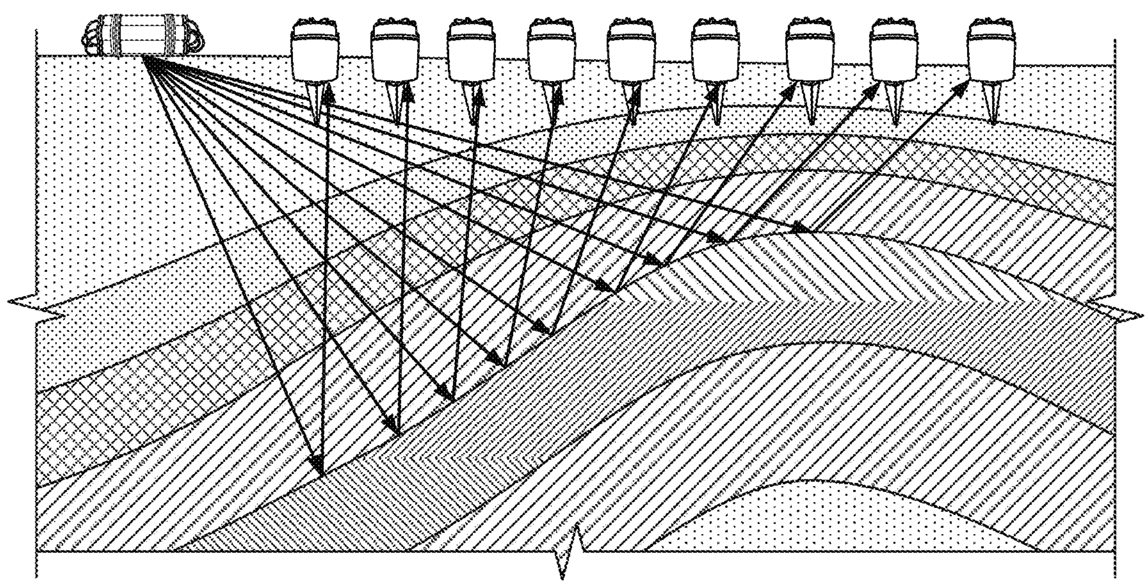
Figure 2D:
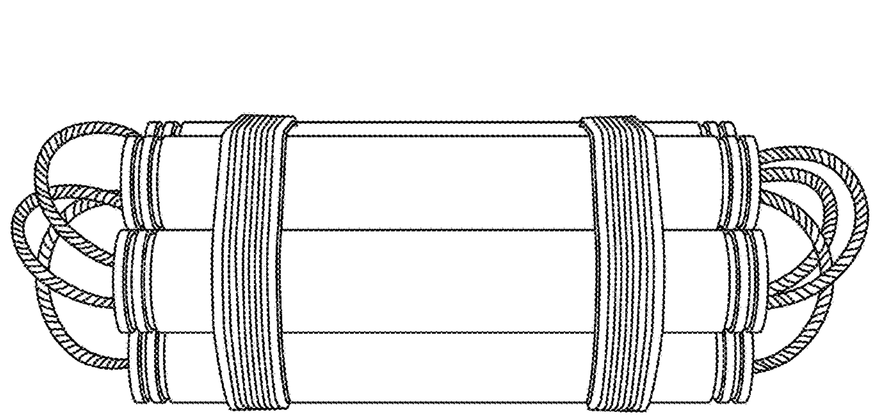
FIG. 2D illustrates dynamite which may be used as an energy source for initiating seismic waves reflected by geological features and recorded by the nodal geophone of FIG. 2C.
Figure 2C:
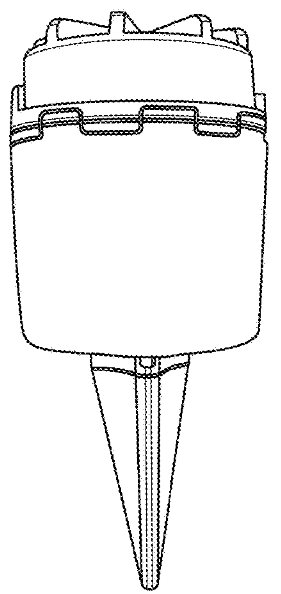
FIG. 2C illustrates a nodal geophone for recording seismic data.

FIG. 2A and FIG. 2B show diagrams of illustrative embodiments in which acoustic waves are generated and reflected off of various geological features before being recorded. In FIG. 2A a source of acoustic waves, such as a shot from a dynamite blast, travels through various layers of sand, shale, and limestone, and are reflected back to be recorded by a geophone. In FIG. 2B, a sound generator generates acoustic waves which travel through various layers of sand, and reflect of a boundary, such as a layer of gas, oil and water trapped between layers of shale. In this illustration, a plurality of geophones is used to capture seismic data from multiple vantage points in order to record seismic information over a wider area. By way of example, and not by way of limitation, FIG. 2C illustrates a nodal geophone for recording seismic data. By way of example and not by way of limitation, FIG. 2D illustrates dynamite, which may be used as an energy source for initiating acoustic waves reflected by geological features and recorded by the nodal geophone of FIG. 2C.

Now referring to FIG. 3A and FIG. 3B, schematic diagrams of obtaining seismic data from a changing geological feature are shown. In particular, FIG. 3B shows an illustrative cross-section of a hydrocarbon reservoir being produced using SAGD. In this case, the steam chamber formed by the production is measured by using dynamite as an acoustic wave source, and geophones which collect seismic data from reflections off of the geological features of the steam chamber.

In an embodiment, the system and method start with a pre-stack or post-stack 3D inversion of a baseline seismic survey. After acquiring a 3D seismic baseline, such as shown in FIG. 3C, the present system and method periodically obtains additional 3D seismic volume named monitor, such as illustrated in FIG. 3D. The monitor is aligned with the baseline, for example by proper alignment and scaling to correlate various geologic features between the monitor (FIG. 3D) and the baseline (FIG. 3C). This alignment is usually needed to account for different acoustic wave travel times with and without the presence of steam, for example.

In an embodiment, the monitor is collected at appropriate time intervals to determine elastic properties of a hydrocarbon reservoir. Same as the baseline, a pre-stack or post-stack 3D inversion of the monitor is calculated using new monitor. After generating 3D inversions of the monitor, by subtracting the inverted volume from the baseline, it is possible to obtain a mask from a 4D seismic inversion showing the changes occurring over time.

As noted earlier, the current 4D seismic modeling process can take several months, and requires specialized knowledge of the different processes and the geology of the reservoir (Lerat, et al., 2010). Additionally, the results can be subjective depending on the expert making the interpretation, and more variability may be introduced by the various software available. Consequently, it may be difficult to obtain information from 4D seismic inversion in a timely manner for use in producing a hydrocarbon reservoir.

Therefore, in accordance with illustrative embodiments, the present system and method utilizes data collected in the 3D seismic baseline and subsequent monitor to train an artificial neural network how to recognize the physical changes of the reservoir caused by the hydrocarbon production over time (e.g. developing steam chamber).

In accordance with an embodiment, for the purpose of training a neural network, both the baseline image in FIG. 3C and subsequent monitors (e.g. FIG. 3D) are utilized. However, before being provided to the artificial neural network, the monitor is aligned with the baseline to account for seismic waves which travel with different velocities at different fluid saturation levels. As described above, by producing oil from reservoir, water or other fluids would gradually replace the produced oil in the reservoir. Depending on the density differences between oil and the replaced fluid, the seismic waves will travel with different velocities at different stages of production. More specifically, steam reduces the density of the reservoir more than oil. Therefore, seismic waves will travel slower in a steamed zone in comparison to a virgin reservoir. Therefore, generally it is required to apply seismic trace alignment to a new monitor (e.g. FIG. 3D) before any analysis. By way of example, seismic trace alignment based on non-rigid matching is applied to align a new monitor (Liner & Clapp, 2004).

Figure 4A:
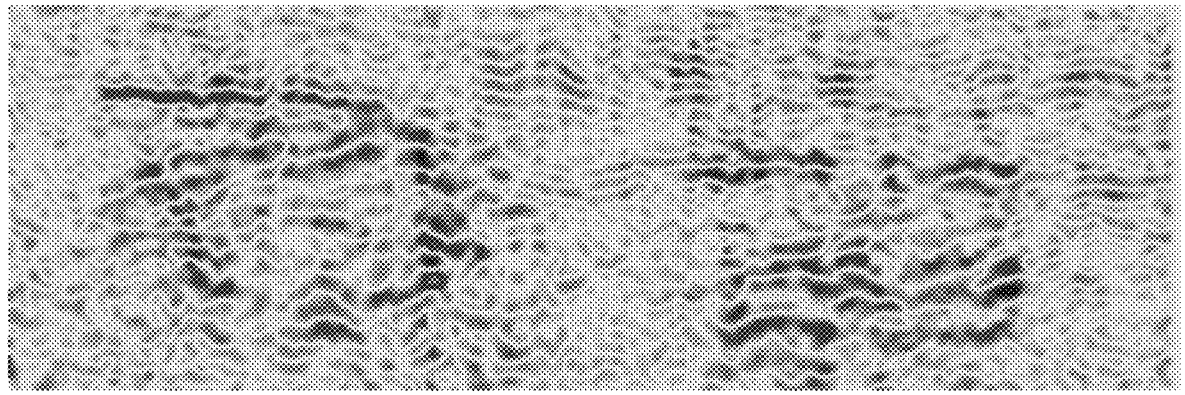
FIG. 4A illustrates a 2D slide of a three-dimensional (3D) volume of seismic differences between baseline and the monitor
Figure 4B:
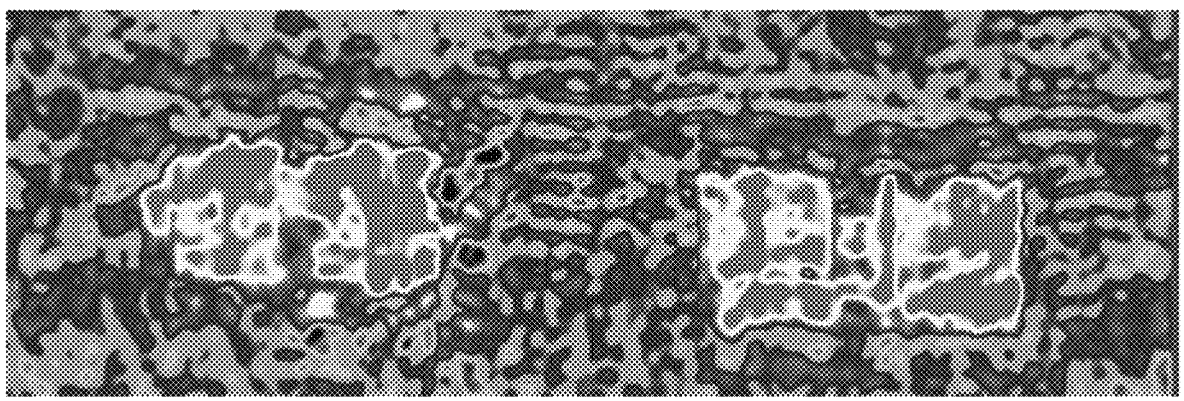
FIG. 4B illustrates a 2D slice of a conventional four-dimensional (4D) inversion results of the same area.
Figure 4C:
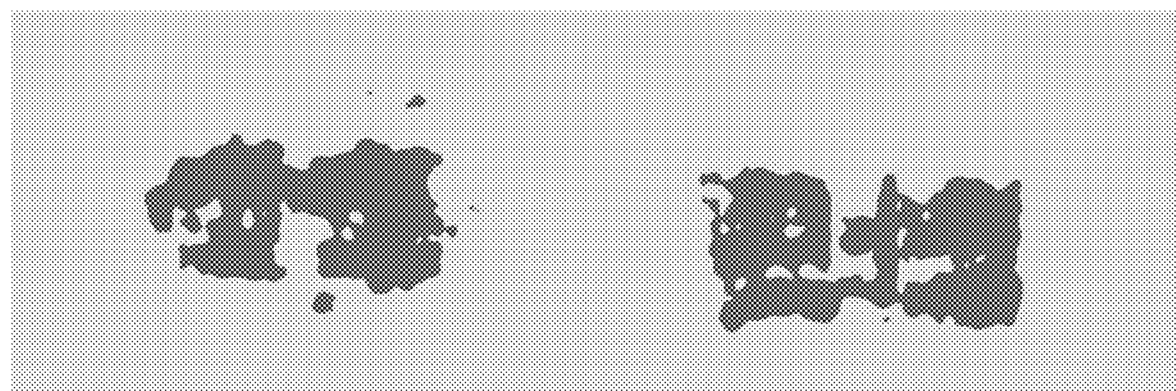
FIG. 4C illustrates the mask that has been obtained by applying a cut-off to the conventional 4D inversion results.
Figure 5A:
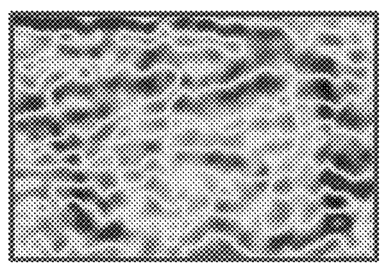
FIG. 5A shows the cropped window of the seismic differences.
Figure 5B:
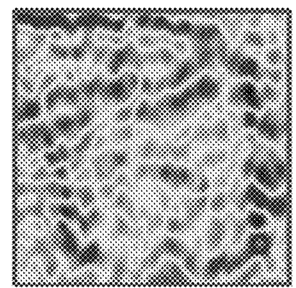
FIG. 5B shows the resized 2D slice of the seismic differences.
Figure 5C:
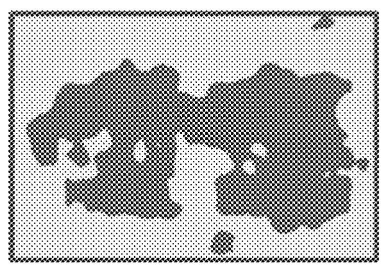
FIG. 5C illustrates the cropped windows of the mask generated from conventional 4D inversion.
Figure 5D:
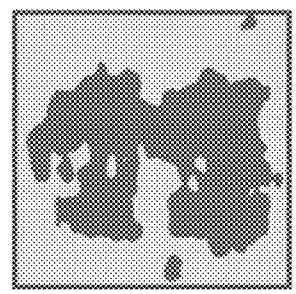
FIG. 5D shows the resized 2D slice of the mask.
Figure 5E:
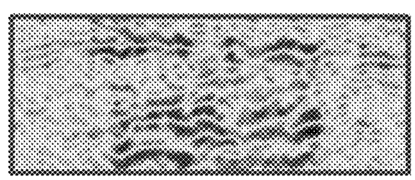
FIG. 5E to 5H show a different window inside the 2D slice that has been selected and resized.
Figure 5F:
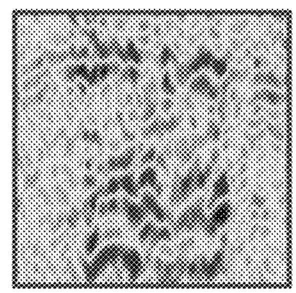
Figure 5G:
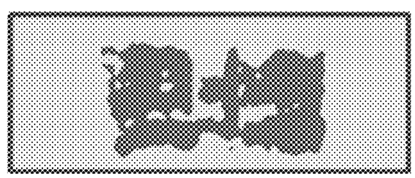
Figure 5H:
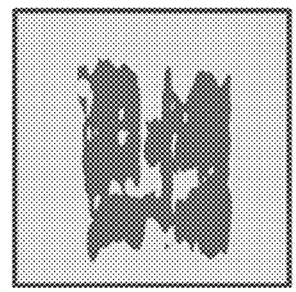

Now referring to FIG. 4A, in accordance with an illustrative embodiment of the present system and method, a 3D seismic volume is processed into a plurality of 2D image slices, such that the artificial neural network can process a 3D seismic volume as multiple 2D images. By way of example, and not by way of limitation, FIG. 4B shows 4D inversion that has been calculated by conventional 4D inversion workflow, and FIG. 4C shows a target mask generated from 4D inversion by applying a threshold to the 4D inversion. For each inline and crossline, a sliding window technique may be used to generate many 2D slices with different sizes. Then, each image is resized such that they all are equal sizes. The resized images are illustrated in FIG. 5A to 5H. In embodiment, the number of datasets for training the artificial neural network may be increased by flipping each 2D slide.

Figure 6A:
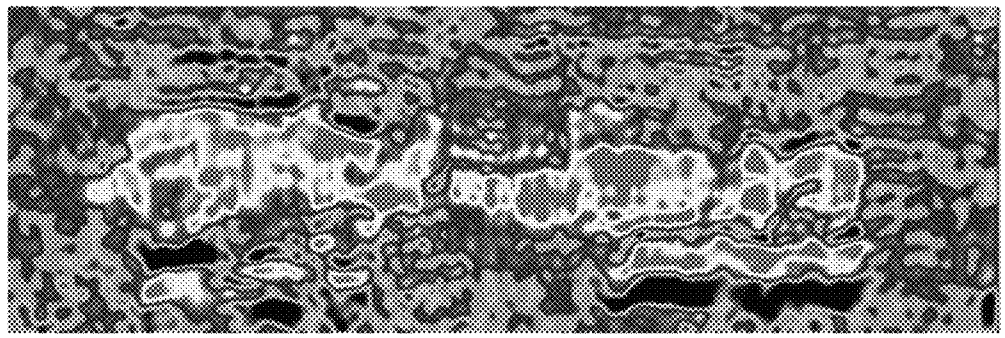
FIG. 6A illustrates the cross-section of a 4D inversion generated by baseline and second monitor (4 years after the first monitor and 8 years from the baseline) in the same reservoir.
Figure 6B:
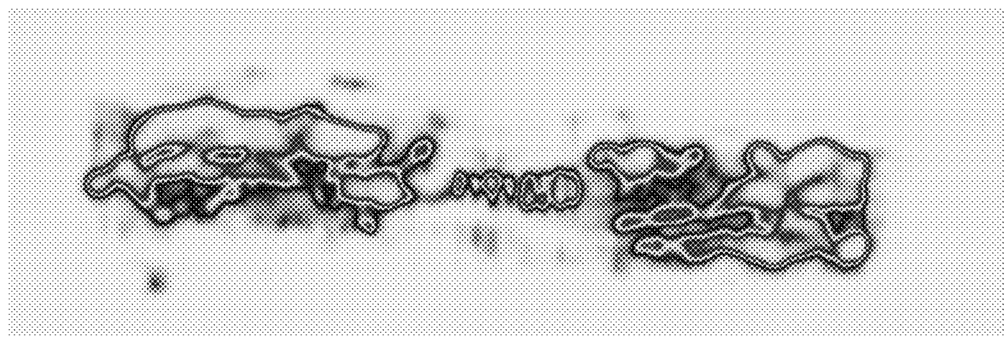
FIG. 6B illustrates the cross-section of predicted steam chamber by the trained neural network for the same baseline and the monitor for the comparison.

FIGS. 6A and 6B show the comparison between the result of 4D inversion and artificial neural network. FIG. 6A shows the 4D inversion that was calculate at the same reservoir from the baseline and the second monitor that was 8 years apart from the baseline and 4 year apart from first monitor. Note that second monitor was never used in the training process for the neural network and was only used to validation of the result of the neural network. The network was trained on the baseline and the first monitor as it was described previously. As it shown in FIGS. 6A and 6B, there is a good match between the two methods. It takes more than 6 months to produce a 4D inversion (FIG. 6A) however, the neural network can be run in a few minutes.

Figure 7A:
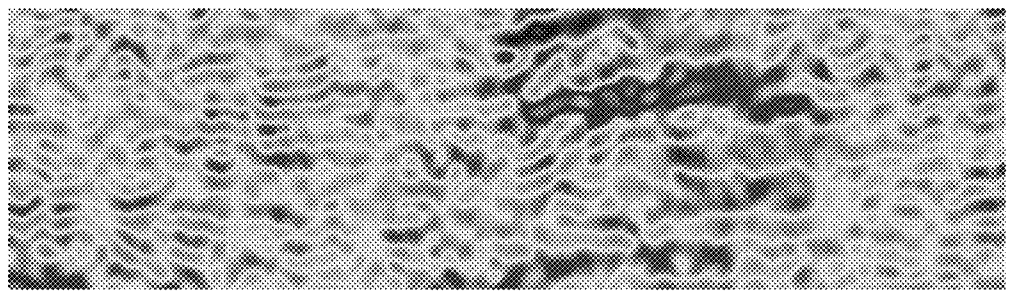
FIG. 7A illustrates the cross section of 3D differences between baseline and aligned monitor in a different reservoir.
Figure 7B:
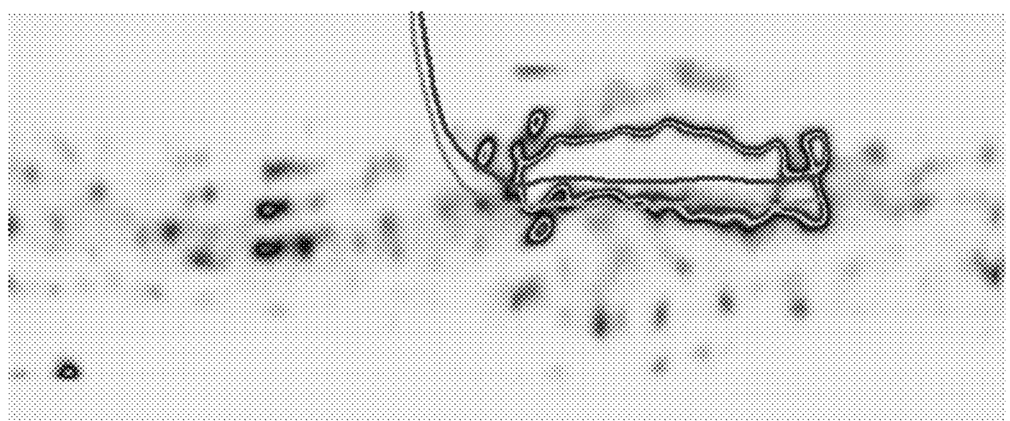
FIG. 7B illustrates the prediction of neural network of the steam chamber.

FIGS. 7A and 7B show an illustrative example of using a previously trained model to predict the steam chamber from full stack baseline and monitor for a different reservoir. These figures are also described in more detail in the case study described further below. For a different reservoir that is located at a different geological unit, this method was applied. In this case, baseline and monitor were 4 years apart in a SAGD project. Full stack seismic monitor was aligned with full stack baseline. The 3D seismic differences were then calculated from baseline and aligned monitor. The neural network that was trained on a different reservoir (previously described example) was used to predict steam chamber in this reservoir. FIG. 7A shows a 2D cross-section of the 3D seismic differences. FIG. 7B shows the prediction of the steam chamber by trained model. There is a very good agreement of the location of the steam chamber and the location of the horizontal wells. Further studies showed the AI generated steam chamber is very close to the actual 4D inversion that took more than 4 months to produce. The total runtime for neural network was about one day including some quality control (QC) operations performed on the results.

Figure 8:
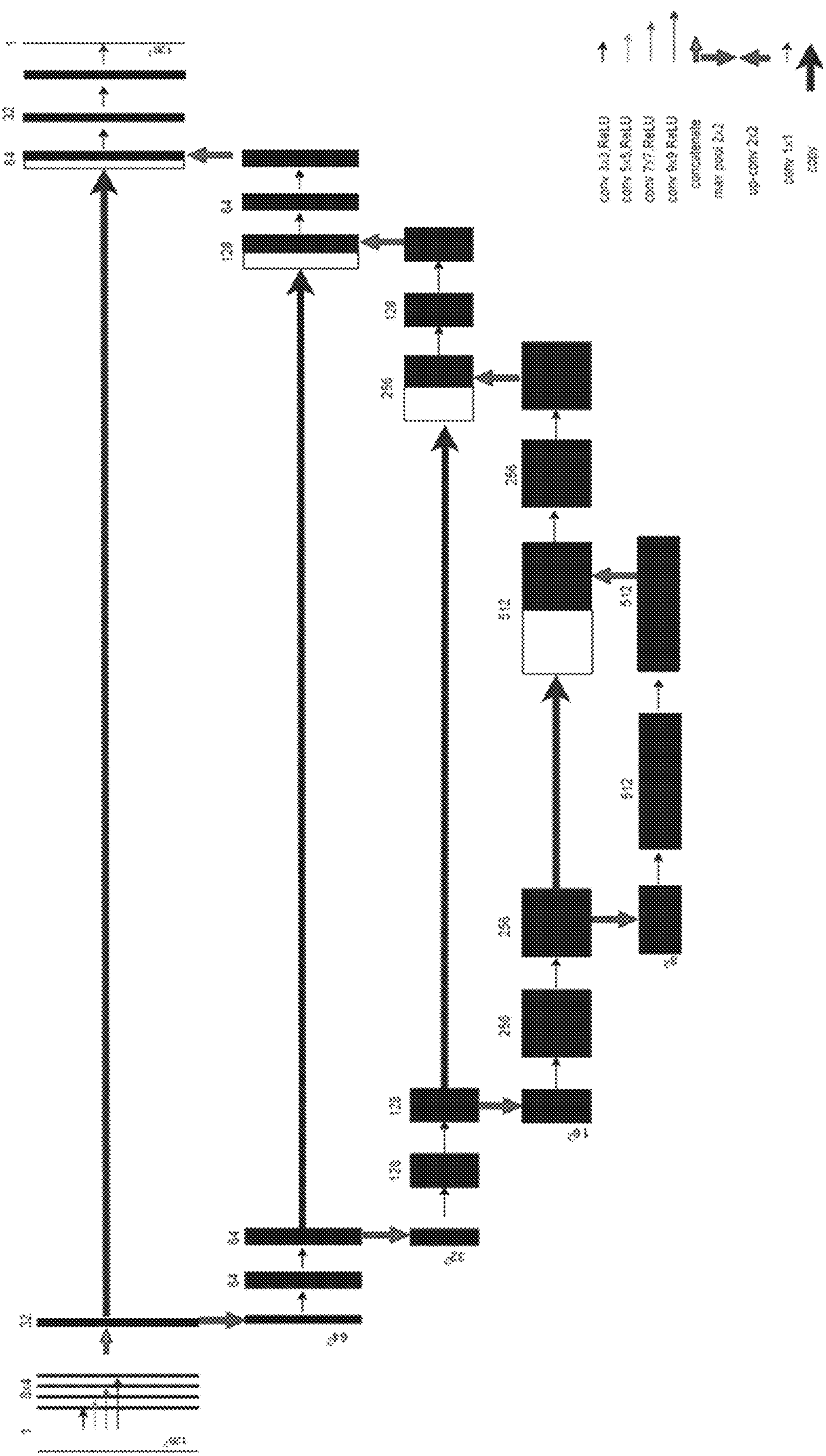
FIG. 8 is a schematic diagram of an artificial neural network architecture in accordance with an illustrative embodiment of the present system and method.

FIG. 8 is a schematic diagram of an artificial neural network architecture, wherein each box corresponds to a multi filter convolutional layer. Here, the number of filters is noted at the top of each box. The size of each layer is also provided at the lower left edge of the box. White boxes represent copied feature maps, and the arrows denote the different operations.

The system may utilize a computing device, such as a generic computing device as described with reference to FIG. 9 (please see below), to perform computations, and to store the results in memory or storage devices, or embodied in an integrated circuit or digital signal processor in one or more computer nodes as described above.

Figure 9:
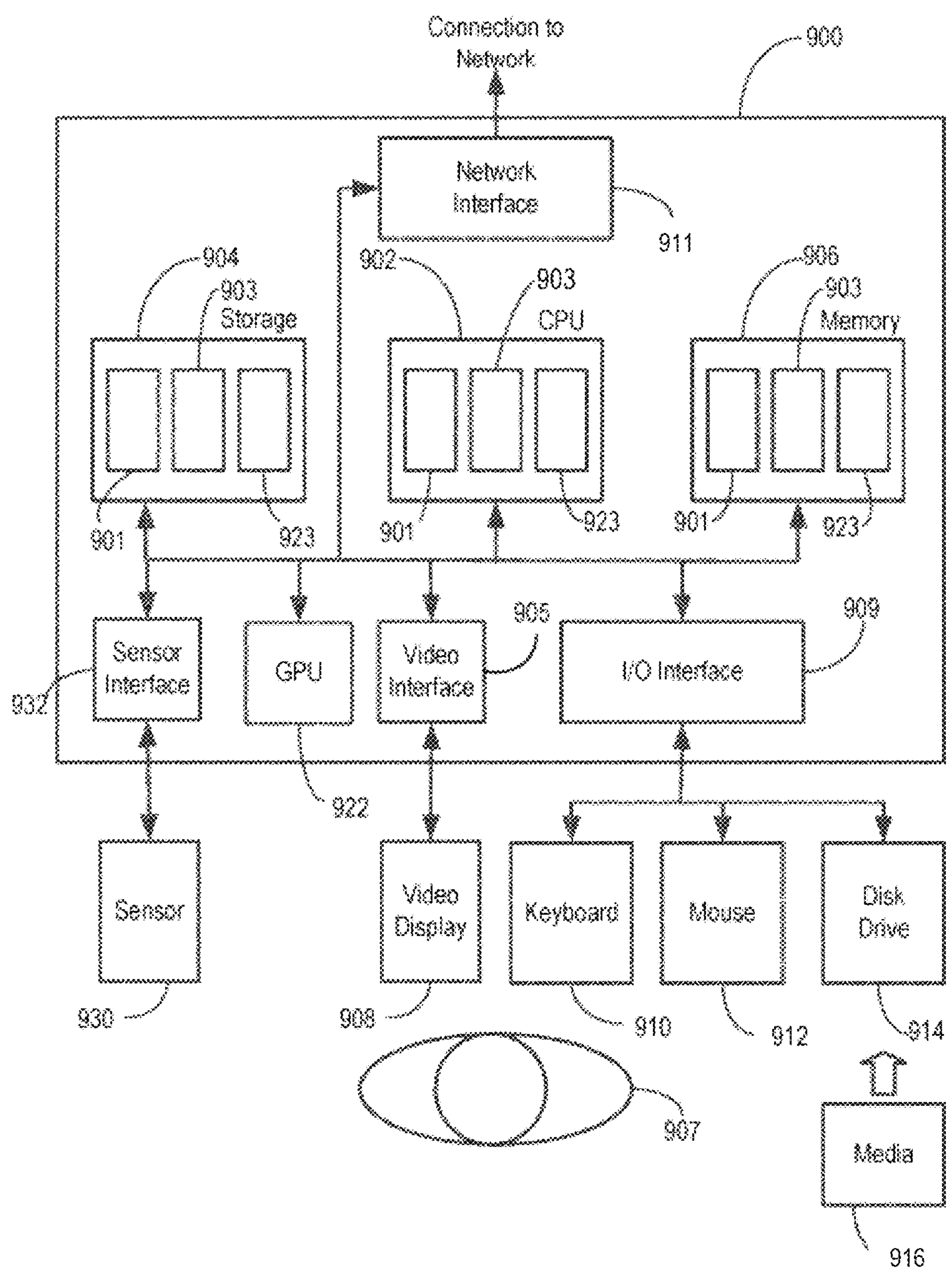
FIG. 9 shows a schematic block diagram of an illustrative computing device which may provide a suitable platform for processing seismic images and training an artificial neural network in accordance with various embodiments.

Now referring to FIG. 9 shown is a schematic block diagram of a generic computing device that may provide a suitable operating environment in one or more embodiments for the present system and method, including hosting and execution of an artificial neural network in accordance with various embodiments. A suitably configured computer device, and associated communications networks, devices, software, and firmware may provide a platform for enabling one or more embodiments as described above. By way of example, FIG. 9 shows a generic computer device 900 that may include a central processing unit ("CPU") 902 connected to a storage unit 904 and to a random access memory 906. The CPU 902 may process an operating system 901, application program 903, and data 923. The operating system 901, application program 903, and data 923 may be stored in storage unit 904 and loaded into memory 906, as may be required. Computer device 900 may further include a graphics processing unit (GPU) 922 which is operatively connected to CPU 902 and to memory 906 to offload intensive image processing calculations from CPU 902 and run these calculations in parallel with CPU 902. An operator 907 may interact with the computer device 900 using a video display 908 connected by a video interface 905, and various input/output devices such as a keyboard 910, mouse 912, and storage 914 connected by an I/O interface 909. In known manner, the mouse 912 may be configured to control movement of a cursor or pointer icon in the video display 908, and to operate various graphical user interface (GUI) controls appearing in the video display 908. The computer device 900 may form part of a network via a network interface 911, allowing the computer device 900 to communicate with other suitably configured data processing systems or circuits. A non-transitory medium 916 may be used to store executable code embodying one or more embodiments of the present method on the generic computing device 900. A sensor 930 connected to computer device 900 via a sensor interface 932 may be utilized to receive data inputs from various measurement devices. These data inputs may be processed and utilized as inputs or feedback to various processes and control functions executed by the system.

Illustrative Training Workflow

An illustrative training workflow for the artificial neural network of FIG. 8 will now be described.

By way of example, the present system and method may use full stacks seismic data as the input to the artificial neural network of FIG. 8 in order to train the artificial neural network to predict the location of steam chamber or heated zone in the case of SAGD project. The same method can also be used to train and predict the spatial extend of the zone that the hydrocarbon has been produced between the baseline and the monitor. In an embodiment, the artificial neural network is a deep Convolutional Neural Networks (CNN) which is trained using 2D image slices obtained from multiple 3D seismic volumes used in a 4D seismic study. CNN models are highly successful at image recognition and segmentation, but generally require 2D images to work with. One of the well-known CNN architectures is U-net (Ronneberger, Fischer, & Brox, 2015). A sample input resolution for the U-net neural network shown in FIG. 8 is a 128×128 pixel image. The goal is to segment the objects in an image to identify features of interest, such as the formation of a steam chamber as described earlier.

In an embodiment, full stack is used. Pre-stack volumes can also be used for training and prediction process. The following steps were used to build data training and a data set, as well as preparing a new data set to be used for prediction.

For training and prediction purpose, the new monitor must be aligned with the baseline. As described previously, FIG. 3C shows a baseline, followed by a new monitor shown in FIG. 3D. As explained earlier, the new monitor may be aligned with the baseline to account for variations in seismic wave speeds. Seismic differences are then calculated by subtracting the monitor seismic volume from baseline. At this stage, partial stacks can be used as input to U-Net or an average volume can be calculated from three partial stack differences and used in the training process.

The calculated difference is a 3D volume. FIG. 4A shows a 2D slice of the 3D differences volume. FIG. 4B shows the same cross section from 4D inverted volume that was calculated for the same reservoir. It takes several months and special skills to generate a 4D inversion. However, a well-trained neural network can produce similar result in a few minutes. To train a supervised neural network, for every input image there should be a target. Neural network would be able to regenerate the output for a given input. The target image is generated by applying a threshold value to an already inverted 4D volume to create 0-1 mask. FIG. 4C shows the mask generated from FIG. 4B and shows the location and the shape of the steam chamber. In FIG. 4C pixels inside the steam chamber have value of one and outside is zero.

The designed U-net neural network accepts only 2D images. Therefore, for each inline and crossline, a sliding window technique was used to generate many 2D slices with different sizes. Then, each image was resized such that they all are equal sizes. FIG. 5A to 5D and FIG. 5E to 5H, show two examples of different size sliding windows that are resized to produce a consistent input and target image size for the U-net neural network. The number of datasets doubled by flipping horizontally each 2D slide. All generated slices are fed to a U-net neural network described in FIG. 8. The seismic differences are the training dataset and the masks are the target.

By training the model, U-net tries to regenerate the mask from input image by minimizing the loss function.

Later, the trained model would be able to predict the probability volume above the threshold that was applied before. Therefore, different U-Nets can be trained on different thresholds. To evaluate the quality of the trained model, an intersection over union (IOU) or Average Jaccard Index (Jaccard, 1912) may be used. IOU is a common matrix that is used to evaluate performance of predicted bounding boxes such as Convolutional Neural Network detectors (R-CNN, Faster R-CNN, YOLO, etc.). An IOU metric ranges between 0-1. The higher the number, the better the trained model. The generated 2D input images are split into training and testing subsets. The U-Net is then trained on training set and the quality of the model is validated on a testing subset with IOU metric.

A proper trained U-net can predict a value between 0-1 for each pixel that shows the probability of being above the threshold. Therefore, it can predict the steam chamber or heated zone (depending on the threshed that was used to generate the mask). The trained model will only accept the same input format that was used for training. For prediction purpose, it is required the monitor also be aligned with the baseline. The full stack difference is calculated from aligned monitor and the baseline. The 2D resized differences are fed to the trained model for the prediction (refer to step 3 above). To generate more accurate results, for each pixel multiple inline and crossline with difference window size can be used. The average predicted probability in 3D can be calculated from the prediction of many 2D image slices.

For this illustrative study, Python 3.3 programming language (Python 3.3.0 Release, n.d.) was chosen as the main programming language. Keras API (Keras Documentation, n.d.) was used as the front-end for the neural network model. TensorFlow (Abadi, et al., 2016) was used for the back-end. To make the training and prediction faster, A GPU version of TensorFlow was employed.

Case Study

As an illustrative case study, two steam assisted gravity drainage (SAGD) projects with completed 4D seismic studies were used. For the first project, there are three seismic datasets: baseline, monitor 1 and monitor 2 which were shot 4 years apart from each other. The baseline was shot before any steam injection and oil production; therefore, it was used to align the other two, later acquired monitors. The full stack seismic volume was used to calculate difference between monitor 1 and baseline and it was used to train the model. To make the training process simpler, both training and testing data set were filtered to be between 15 to 150 hrz. By way of example, and not by way of limitation, a total number of 11,750 2D slices were generated by different window size and sliding over the seismic inline and crosslines for training, and 256 slices were generated from the trained model for validation.

The second monitor was used for prediction and blind test. All training, validation and prediction slices were resized to an illustrative image size of 128×128 pixels. It will be appreciated that this pixel size was chosen for expediency, and that image sizes of increased resolution could be used with platforms having adequate processing power and memory storage.

FIG. 8, described previously, shows the U-net architecture that was used for this case study. A windows 10 PC was used for training. The CPU was a 16 core Intel® Xeon® Gold 5122 @ 3.60 GHz with 256 GB of RAM and installed GPU was NVIDIA Quadro P5000 with 16 GB of RAM. The U-Net was modeled using TensorFlow. An Adaptive Moment Estimation (Adam) optimization algorithm (Kingma & Ba, 2015) was used to minimize the Cross-Entropy (Goodfellow, Bengio, & Courville, 2016) loss function with a learning rate of 0.001 and batch size of 64. The training process was terminated by early stopping method after 9 epochs. The final Cross-Entropy loss values for training and testing set were respectively: 0.086 and 0.0800. Total training time was 46 minutes. The trained model was used to predict steam chamber for first and second monitor. The prediction time was about 30 minutes. As explained before, the present model was designed to predict the probability of being above a training cut-off. To obtain better results, each pixel was predicted twice using both in-line and cross-line, and the average probability value was calculated. The IOU for first monitor after averaging was calculated as 0.70. The IOU for the second monitor was: 0.47. It should be noted that there would be discrepancies between predicted values and target 4D since there is extra information incorporated in the 4D (i.e. well data) where only seismic data was used in the neural network model. Also, it is normal for the machine learning model to perform better on the training data set than blind test.

FIGS. 6A and 6B compare the result of the blind test. FIG. 6A shows the cross section form the conventional 4D inversion that was performed on second monitor and FIG. 6B shows the same cross section from the predicted volume by the trained U-net. There is a very good match in most cases between the steam chamber in 4D inversion and the result from neural network. Note that prediction process took few minutes for this case.

For another test, the previously trained model on the first reservoir was used to predict steam chamber in a different SAGD project. FIGS. 7A and 7B show the results. FIG. 7A shows the cross section from the 3D difference volume that was calculated from full stack baseline and full stack monitor. FIG. 7B shows the predicted steam chamber utilizing the model trained by the U-net neural network. As shown in this illustrative example, the pre-trained model can thus be used in a completely different reservoir since it is less sensitive to the frequency and acquisition parameters of the seismic data.

With this case study, the inventors have concluded that the present system and method for estimating a location of the steam chamber or heated zone in two SAGD projects utilizing a trained deep convolutional neural network provides surprisingly accurate predictions. It is therefore expected that the present system and method can be used to monitor steam chamber and heated zone formation in SAGD or Cyclic Steam Stimulation (CSS) recovery methods, or in any similar in situ recovery method. A well-trained neural network most likely would be able to predict the location produced oil at a different reservoir.

Advantageously, the present system and method provides a very fast, robust technique for estimating the formation of heated zones and steam chambers in a hydrocarbon reservoir utilizing a model trained using an artificial neural network. It is a robust technique that can be modified and used in different applications, utilizing readily available seismic data.

Full stack volumes were used in the presented case study. However, the entire process could be done with partial stack volumes. The difference would be instead of having 1 input image at the beginning, there will be several images (one for each partial stack). Therefore, the first layer must be modified slightly for input to a CNN.

Although a pre-trained model performed well in a completely different reservoir, it is also recommended to re-train the model if there is any 4D data available for the new reservoir. This will help increase the accuracy of the prediction results.

Advantageously, the model developed in this manner may be used to assist in production of each new hydrocarbon reservoir production project by acquiring a baseline and successive seismic monitor. The model can then be used to provide actionable data, which may be used to modify parameters or alter production methods in order to increase production efficiency. Unlike the traditional 4D inversion that takes several months to complete and needs a lot of specialized skills, the presented method is very fast and easy to implement; therefore the information gained from this technique is relevant to the current status of the reservoir.

Thus, in an aspect, there is provided a method of analyzing reservoir changes during production, comprising: obtaining a seismic baseline of a reservoir prior to its production; acquiring one or more monitors of the reservoir after production has started; aligning the one or more monitors with the baseline to correlate one or more geological features of the reservoir; generating a 3D seismic volume of differences by subtracting the seismic baseline from the one or more aligned monitors; utilizing a sliding window to generate a plurality of 2D image slices from the 3D seismic volume of differences and a mask; and training an artificial neural network utilizing the 2D image slices to predict changes during production of a reservoir based on the seismic baseline and observed differences.

In an embodiment, the seismic baseline is obtained by initiating and recording acoustic waves reflected by geological features of the reservoir prior to its production.

In another embodiment, the one or more monitors are obtained by periodically initiating and recording acoustic waves reflected by geological features of the reservoir as they change during production.

In another embodiment, the plurality of 2D image slices represent image planes derived from the 3D seismic volume of differences generated for the one or more aligned monitors.

In another embodiment, the mask is generated by applying a threshold to identify the one or more geological features of the reservoir.

In another embodiment, the one or more geological features of the reservoir is a steam chamber or a heated zone.

In another embodiment, the one or more monitors are acquired over a duration of a 4D seismic study.

In another embodiment, the artificial neural network is trained to predict changes to the steam chamber or heated zone during production of the reservoir.

In another embodiment, the prediction of the artificial neural network is compared against actual changes to the steam chamber or heated zone during a 4D seismic study in order to improve the predictive model for subsequent predictions.

In another embodiment, the method further comprises training the artificial neural network utilizing a plurality of 4D seismic studies from a plurality of reservoirs.

In another aspect, there is provided a system for analyzing reservoir changes during production, the system adapted to: obtain a seismic baseline of a reservoir prior to its production; acquire one or more monitors of the reservoir after production has started; align the one or more monitors with the baseline to correlate one or more geological features of the reservoir; generate a 3D seismic volume of differences by subtracting the seismic baseline from the one or more aligned monitors; utilize a sliding window to generate a plurality of 2D image slices from the 3D seismic volume of differences and a mask; and train an artificial neural network utilizing the 2D image slices to predict changes during production of a reservoir based on the seismic baseline and observed differences.

In an embodiment, the seismic baseline is obtained by initiating and recording acoustic waves reflected by geological features of the reservoir prior to its production.

In an embodiment, the one or more monitors are obtained by periodically initiating and recording acoustic waves reflected by geological features of the reservoir as they change during production.

In an embodiment, the plurality of 2D image slices represent image planes derived from the 3D seismic volume of differences generated for the one or more aligned monitors.

In an embodiment, the mask is generated by applying a threshold to identify the one or more geological features of the reservoir.

In an embodiment, the one or more geological features of the reservoir is a steam chamber or a heated zone.

In an embodiment, the one or more monitors are acquired over a duration of a 4D seismic study.

In an embodiment, the artificial neural network is trained to predicting changes to the steam chamber or heated zone during production of the reservoir.

In an embodiment, the prediction of the artificial neural network is compared against actual changes to the steam chamber or heated zone during a 4D seismic study in order to improve the predictive model for subsequent predictions.

In an embodiment, the system is further adapted to train the artificial neural network utilizing a plurality of 4D seismic studies from a plurality of reservoirs.

While illustrative embodiments have been described above by way of example, it will be appreciated that various changes and modifications may be made without departing from the scope of the invention, which is defined by the following claims.

REFERENCES

Abadi, M., Barham, P., Chen, J., Chen, Z., Davis, A., Dean, J., . . . Zheng, X. (2016).

TensorFlow: a system for large-scale machine learning. arXiv: Distributed, Parallel, and Cluster Computing, 265-283. Retrieved 2 18, 2019, from https://usenix.org/system/files/conference/osdi16/osdi16-abadi.pdf Goodfellow, I., Bengio, Y., & Courville, A. (2016). Deep Learning. MIT Press. Retrieved 3 19, 2019, from http://www.deeplearningbook.org Jaccard, P. (1912). THE DISTRIBUTION OF THE FLORA IN THE ALPINE ZONE.1. New Phytologist, 11(2), 37-50. Retrieved 3 14, 2019, from http://biocomparison.ucoz.ru/_ld/0/92_jaccard_1912.pdf Keras Documentation. (n.d.). Retrieved 3 21, 2019, from https://keras.io/#you-have-just-found-keras Kingma, D. P., & Ba, J. (2015). Adam: A Method for Stochastic Optimization. arXiv: Learning. Retrieved 3 19, 2019, from https://arxiv.org/pdf/1412.6980

Lerat, O., Adjémian, F., Baroni, A., Etienne, G., Renard, G., Bathellier, E., . . . Euzen, T. (2010). Modelling of 4D Seismic Data for the Monitoring of Steam Chamber Growth During the SAGD Process. Journal of Canadian Petroleum Technology, 49(06), 21-30. Retrieved 2 6, 2019, from https://onepetro.org/journal-paper/spe-138401-pa Liner, C. L., & Clapp, R. G. (2004). Nonlinear pairwise alignment of seismic traces. Geophysics, 23(11), 1146-1150. Retrieved 2 7, 2019, from http://sepwww.stanford.edu/data/media/public/docs/sep112/bob2.pdf Python 3.3.0 Release. (n.d.). Retrieved 3 21, 2019, from Python.org: https://www.python.org/download/releases/3.3.0/

Ronneberger, O., Fischer, P., & Brox, T. (2015). U-Net: Convolutional Networks for Biomedical Image Segmentation. arXiv: Computer Vision and Pattern Recognition, 234-241. Retrieved 2 6, 2019, from https://arxiv.org/pdf/1505.04597

U-Net: Convolutional Networks for Biomedical Image Segmentation. (n.d.). Retrieved 2 6, 2019, from https://lmb.informatik.uni-freiburg.de/people/ronneber/u-net/

The invention claimed is:

1. A method of analyzing reservoir changes during production to increase reservoir production efficiency, comprising:

obtaining a seismic baseline of a reservoir prior to the production;

acquiring at least one seismic monitor of the reservoir after the production has started;

aligning the at least one seismic monitor with the seismic baseline to correlate one or more geological features of the reservoir;

generating a 3D seismic volume of differences by subtracting the seismic baseline from the aligned at least one seismic monitor;

utilizing a sliding window to generate a plurality of 2D image slices from the 3D seismic volume of differences and a mask;

training an artificial neural network utilizing the plurality of 2D image slices to generate a prediction model that predicts the reservoir changes during the production of the reservoir based on the seismic baseline and observed differences;

using the prediction model generated by the artificial neural network to generate actionable data to increase the reservoir production efficiency; and using the actionable data to alter production methods in order to increase the reservoir production efficiency.

2. The method of claim 1, wherein:

the seismic baseline is obtained by initiating and recording acoustic waves reflected by the one or more geological features of the reservoir prior to the production.

3. The method of claim 1, wherein:

the at least one seismic monitor is obtained by periodically initiating and recording acoustic waves reflected by the one or more geological features of the reservoir as the one or more geological features change during the production.

4. The method of claim 3, wherein:

the plurality of 2D image slices represent image planes derived from the 3D seismic volume of differences generated for the aligned at least one seismic monitor.

5. The method of claim 1, wherein:

the mask is generated by applying a threshold to identify the one or more geological features of the reservoir.

6. The method of claim 5, wherein:

the one or more geological features of the reservoir are a steam chamber or a heated zone.

7. The method of claim 1, wherein:

the at least one seismic monitor is acquired over a duration of a 4D seismic study.

8. The method of claim 7, wherein: the prediction model generated by the artificial neural network is configured to predict a location of a steam chamber or a heated zone during the production.

9. The method of claim 8, wherein: the prediction model generated by the artificial neural network is further trained from data obtained from the 4D seismic study in order to improve the prediction model for subsequent predictions.

10. The method of claim 9, further comprising:

training the artificial neural network utilizing a plurality of 4D seismic studies from a plurality of reservoirs.

11. The method of claim 1, wherein: the prediction model generated by the artificial neural network is used to generate the actionable data that is used to alter the production methods in order to increase the reservoir production efficiency for the reservoir corresponding to the seismic baseline and the least one seismic monitor.

12. The method of claim 1, wherein: the prediction model generated by the artificial neural network is used to generate the actionable data that is used to alter the production methods in order to increase the reservoir production efficiency for a new reservoir different than the reservoir corresponding to the seismic baseline and the least one seismic monitor.

13. The method of claim 12, wherein:

the prediction model generated by the artificial neural network is further trained from data obtained from a 4D seismic study of the new reservoir.

14. A system for analyzing reservoir changes during production to increase reservoir production efficiency, the system adapted to:

obtain a seismic baseline of a reservoir prior to the production;

acquire at least one seismic monitor of the reservoir after the production has started;

align the at least one seismic monitor with the seismic baseline to correlate one or more geological features of the reservoir;

generate a 3D seismic volume of differences by subtracting the seismic baseline from the aligned at least one seismic monitor;

utilize a sliding window to generate a plurality of 2D image slices from the 3D seismic volume of differences and a mask;

train an artificial neural network utilizing the plurality of 2D image slices to generate a prediction model that predicts the reservoir changes during the production of the reservoir based on the seismic baseline and observed differences;

use the prediction model generated by the artificial neural network to generate actionable data to increase the reservoir production efficiency; and use the actionable data to alter production methods in order to increase the reservoir production efficiency.

15. The system of claim 14, wherein:

the seismic baseline is obtained by initiating and recording acoustic waves reflected by the one or more geological features of the reservoir prior to the production.

16. The system of claim 14, wherein:

the at least one seismic monitor is obtained by periodically initiating and recording acoustic waves reflected by the one or more geological features of the reservoir as the one or more geological features change during the production.

17. The system of claim 16, wherein:

the plurality of 2D image slices represent image planes derived from the 3D seismic volume of differences generated for the aligned at least one seismic monitor.

18. The system of claim 14, wherein:

the mask is generated by applying a threshold to identify the one or more geological features of the reservoir.

19. The system of claim 18, wherein:

the one or more geological features of the reservoir are a steam chamber or a heated zone.

20. The system of claim 14, wherein:

the at least one seismic monitor is acquired over a duration of a 4D seismic study.

21. The system of claim 14, wherein: the prediction model generated by the artificial neural network is configured to predict a location of a steam chamber or a heated zone during the production.

22. The system of claim 21, wherein:

the prediction model generated by the artificial neural network is further trained from data obtained from a 4D seismic study in order to improve the prediction model for subsequent predictions.

23. The system of claim 22, wherein:

the prediction model generated by the artificial neural network is trained utilizing a plurality of 4D seismic studies from a plurality of reservoirs.

* * * * *